Dec. 23, 1941. A. H. THOMPSON 2,267,436
NUT-TYPE LOCKING ELEMENT FOR SCREWS
Filed June 15, 1939
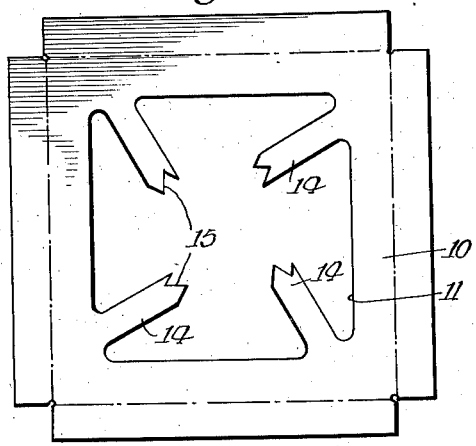
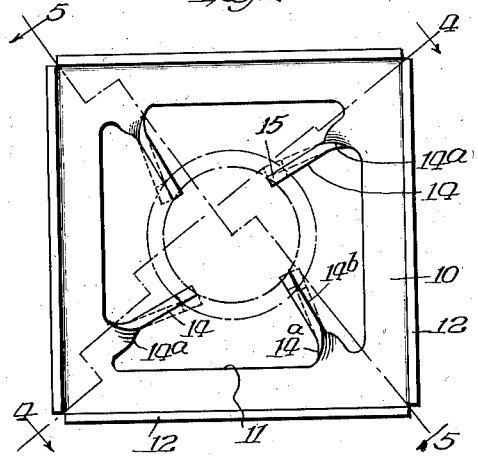
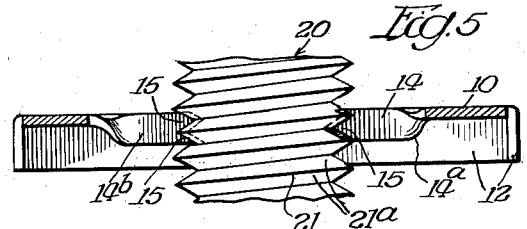
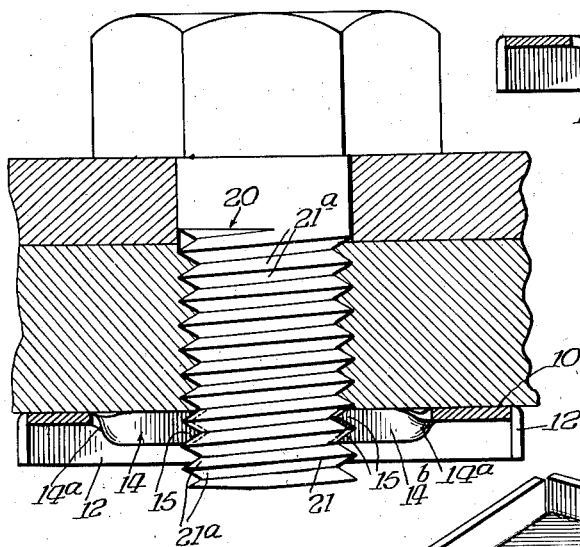
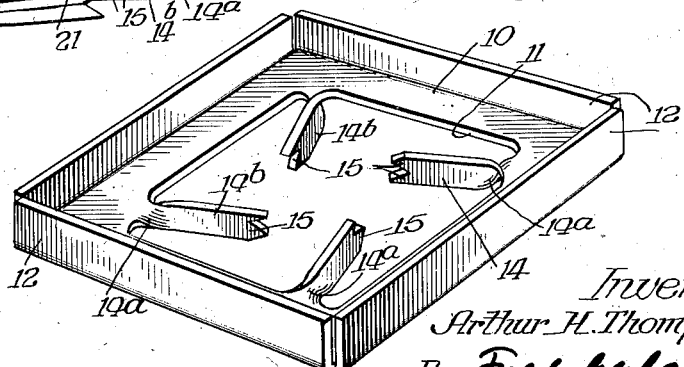
Inventor
Arthur H. Thompson
By Fred Gerlach
his Atty Patented Dec. 23, 1941

2,267,436

UNITED STATES PATENT OFFICE 2,267,436

NUT-TYPE LOCKING ELEMENT FOR SCREWS

Arthur H. Thompson, Chicago, Ill., assignor to Thompson-Bremer & Co., Chicago, Ill., a corporation of Illinois Application June 15, 1939, Serial No. 279,235

3 Claims. (Cl. 151—15)

The invention relates to locking elements for screws or nuts.

One object of the invention is to provide an improved locking element for a screw which is formed of sheet metal and is provided with integral twisted tongues which are slightly laterally resilient and have their inner ends shaped to extend into and conform to the groove of the screw-thread and to engage the side-faces of the thread, the tongues being extended or angularly positioned so that when the element is turned onto the screw the inner ends of the tongue will slide around the side-faces of the screw thread and when the element is turned in the opposite direction the tongues will bite against the side-faces of the screw-thread and effectively lock the element against reverse rotation.

Another object of the invention is to provide a locking element of this character which will function as a self-locking nut without auxiliary clamping means.

A further object of the invention is to provide a locking element which is generally of new and improved construction, effectively and efficiently fulfills its intended purpose and is an improvement upon, and has certain advantages over, the locking element which forms the subject matter of my copending application for United States Letters Patent filed June 14, 1939, Serial No. 278,989.

Other objects of the invention will be apparent from a consideration of the following detailed description.

The invention consists in the several novel features which are hereinafter set forth and are more particularly defined by claims at the conclusion hereof.

In the drawing: Fig. 1 is a plan of a blank of sheet metal from which the improved locking element is formed. Fig. 2 is a plan of the locking element. Fig. 3 is a perspective of the element. Fig. 4 and Fig. 5 are sections taken on lines 4—4 and 5—5 of Fig. 2, respectively, and illustrating the element in operative position on a screw.

The invention is exemplified in a locking element which is formed of a blank of flat sheet metal of sufficiently heavy stock to provide the desired rigidity in the element. The blank is cut to the shape shown in Fig. 1 and includes stock for a flat rectangular plate 10 which serves as the body of the element. The central portion of plate 10 is cut away to leave a polygonal opening 11. The blank is bent to form marginal upstanding flanges 12 which provide surfaces which are adapted to be engaged by a wrench for turning the element around a screw. The blank is cut with integral inwardly extending portions which are adapted to be shaped into tongues 14 which extend inwardly transversely of the screw and are integral with plate 10. The blank is cut to provide coplanar inward extensions for the formation of the tongues. Each tongue is twisted, as at 14$^a$, adjacent its union with plate 10 so that the tongues will have upstanding or right angle side-faces 14$^b$. The twists in the tongues are made so that the entire tongues will lie within the plane of the outer face of plate 10 so that when the plate is turned to engage the work or a nut it will abut against the work or the nut. Each tongue is cut at its inner end to form vertically extending V-shaped teeth 15, the inner edges of which conform to the V-shaped thread on the screw. Tongues 14, by reason of the union between their outer ends with the plate 10, are slightly resilient transversely of the screw and the teeth 15 are disposed to extend normally slightly within the diameter of the root of the thread. When the element is turned onto the screw the tongue will be sprung slightly outwardly by the screw, as indicated by dotted lines in Fig. 2. The teeth and tongues also constitute means for moving the plate longitudinally of the screw for engagement with the work.

The tongues extend radially so they will be somewhat off the dead center between the outer ends of the tongues where they are joined to plate 10 and the axis of the screw or the center of the plate. This off-center relation is at that side of the dead center which will, when the nut is rotated to turn it onto the screw, flex the tongues in the direction of rotation and thus permit the teeth on the tongues to resiliently engage and slide around the side faces of the screw-thread. When reverse rotative stresses or forces are applied to the element, the resilient engagement of the vertically inclined inner edges of the teeth and the side-faces of the thread will force the inner ends of the teeth toward the dead center and cause them to bite into the side-faces of the screw-thread and thereby automatically lock the nut against reverse rotation. This construction and arrangement of the tongues and teeth render the element self-locking against reverse rotation independently of longitudinal pressure applied to the nut by the work. The teeth 15 on the tongues are helically arranged conformably to the screw-thread of the screw with which the element is to be turned, so that they will all normally engage the thread without longitudinal displacement or deformation.

The inner ends of the teeth 15 have V-shaped faces which conform substantially to the V-shaped groove and side-faces of the screw-threads so that, upon reverse rotation, the resistance of the tongues will produce a wedging action of the teeth against the inclined side-faces of the thread for efficient locking.

In Fig. 4 the element is illustrated as applied to a screw 20 which is provided with a V-shaped thread 21 having inclined side-faces 21ª.

In operation, the element is placed against the end of the screw and rotated to bring the teeth 15 on the inner ends of the tongues into interfitting relation with the groove of the screw-thread 21. The plate may be turned around the screw by applying a wrench to the upstanding flanges 12. During the initial turning movement the tongues 14 will be flexed outwardly slightly by the screw-thread to insure resilient engagement between the ends 15 and the V-shaped side-faces of the screw-thread. The element, by reason of the transverse resiliency of the tongues away from the dead-center position, can be turned onto the screw until it has reached the desired position for locking the work or screw or another nut. If pressure is exerted or vibration is produced which imposes reverse rotative stresses on the nut the stresses will be directed against the ends of the teeth to move the tongues toward their dead centers and longitudinally of the tongues. This will cause the teeth to bite into the inclined side-faces of the screw-thread and lock the element and screw against relative reverse rotation.

The element may be released for reverse rotation by a suitable tool which is adapted to apply pressure in a direction to disengage the tongues from the thread. The element may be used as a clamping nut or as a lock nut for locking a screw or for locking a clamping nut.

The invention exemplifies a one-piece locking element for a screw which is formed of sheet metal and comprises tongues having their inner ends shaped to conform to the groove or side-faces of the screw-thread and in which the tongues are formed by twisting integral portions of the blank relatively to the plane of the body-plate.

The invention is not to be understood as restricted to the details set forth, since these may be modified within the scope of the appended claims, without departing from the spirit and scope of the invention.

Having thus described the invention, what I claim as new and desire to secure by Letters Patent is:

1. As a new article of manufacture, a nut-like locking element for use with a screw, formed from a blank of sheet metal and comprising a plate with a central hole therein for the screw, and a plurality of elongated tongues connected to, and extending inwardly from, the hole defining portion of the plate, said tongues having right angle twists at their roots or outer ends so that the side faces thereof extend substantially at right angles to the plate and embodying teeth at the inner ends thereof adapted when the screw and element are in assembled relation to fit between and engage the side faces of the thread of the screw, said tongues being flexible sidewise in the plane of the plate and extending inwards in such directions that their teeth-equipped inner ends will slide on the side faces of the thread when the element is turned in a tightening direction and will bite into said side faces of the thread when the element is urged rotatively in the opposite direction.

2. As a new article of manufacture, a nut-like locking element for use with a screw, formed from a blank of sheet metal and comprising a polygonal plate having the outer marginal portions thereof bent in one direction to define a continuous polygonal flange and embodying a central over-sized hole for the screw, and a plurality of elongated tongues connected to, and extending inwardly from, the hole defining portion of the plate, said tongues having at the roots or outer ends thereof right angle twists of such design and construction that the tongues are axially offset with respect to the plate in the direction of the flange and have the side faces thereof extending at right angles to the plate, and embodying at their inner ends V-shaped teeth adapted when the screw and element are in assembled relation to fit between and engage the side faces of the thread, said tongues being flexible sidewise in the plane of the plate and extending inwards in such directions that their teeth-equipped inner ends will slide on the side faces of the thread when the element is turned in a tightening direction and will bite into said side faces of the thread when the element is urged rotatively in the opposite direction.

3. As a new article of manufacture, a nut-like locking element for use with a screw, formed of a stamped metal blank and comprising a plate having an over-sized polygonal hole therein for the screw, and a series of elongated tongues connected to, and projecting inwardly from, the portions of the plate that define the corners of the hole, said tongues having right angle twists at their roots or outer ends and embodying at their inner ends V-shaped teeth helically arranged and adapted when the screw and element are in assembled relation to fit between and engage the side faces of the thread, said tongues being flexible sidewise in the plane of the plate and extending inwards in such directions that their teeth-equipped inner ends will slide on the side faces of the thread when the element is turned in a tightening direction and will bite into said side faces of the thread when the element is urged rotatively in the opposite direction.

ARTHUR H. THOMPSON.